United States Patent
Qian et al.

(10) Patent No.: US 10,930,005 B1
(45) Date of Patent: Feb. 23, 2021

(54) PROFILE MATCHING OF BUILDINGS AND URBAN STRUCTURES

(71) Applicant: ObjectVideo Labs, LLC, Tysons, VA (US)

(72) Inventors: Gang Qian, McLean, VA (US);
Huiping Li, Clarksville, MD (US);
Yunxian Zhou Zhou, Herndon, VA (US); David Conger, Sterling, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 97 days.

(21) Appl. No.: 16/118,516

(22) Filed: Aug. 31, 2018

Related U.S. Application Data

(63) Continuation of application No. 15/382,152, filed on Dec. 16, 2016, now Pat. No. 10,127,685.

(Continued)

(51) Int. Cl.
*G06T 7/70* (2017.01)
*G06T 7/73* (2017.01)
(Continued)

(52) U.S. Cl.
CPC .............. *G06T 7/70* (2017.01); *G01C 11/04* (2013.01); *G01C 21/005* (2013.01); *G01S 17/86* (2020.01);
(Continued)

(58) Field of Classification Search
CPC .......... G01S 17/86; G01S 17/89; G06F 16/51; G06F 16/583; G01C 11/04; G01C 21/005;
(Continued)

(56) References Cited

U.S. PATENT DOCUMENTS 6,512,846 B1 * 1/2003 Luo .................... G06K 9/00664
382/164
8,284,190 B2 10/2012 Muktinutalapati
(Continued)

OTHER PUBLICATIONS

Luo, et al. "A physical model-based approach to detecting sky in photographic images." IEEE Transactions on Image Processing 11.3 (2002): 201-212. (Year: 2002).*

(Continued)

*Primary Examiner* — Katrina R Fujita
(74) *Attorney, Agent, or Firm* — Fish & Richardson P.C.

(57) ABSTRACT

A method and apparatus for determining a building/urban profile image location includes extracting a building/urban profile from an obtained image and comparing the image to a database of building/urban profiles. The database may be created by obtaining point cloud data sets scanned building/urban profiles, converting the obtained point cloud data sets to a corresponding 3D surface model, and creating the database of stored building/urban profiles viewed from multiple locations within each of the 3D surface models. By comparing the extracted building/urban profile image with the stored building/urban profiles contained within the database and finding a match the location from which the extracted building/urban profile image was taken can be determined.

14 Claims, 10 Drawing Sheets

Related U.S. Application Data

(60) Provisional application No. 62/268,471, filed on Dec. 16, 2015.

(51) Int. Cl.

| | | |
|---|---|---|
| *G06F 16/583* | (2019.01) | |
| *G06F 16/51* | (2019.01) | |
| *G01S 17/86* | (2020.01) | |
| *G01C 11/04* | (2006.01) | |
| *G01C 21/00* | (2006.01) | |
| *G01S 17/89* | (2020.01) | |
| *G06K 9/46* | (2006.01) | |
| *G06K 9/62* | (2006.01) | |

(52) U.S. Cl.
CPC .............. *G01S 17/89* (2013.01); *G06F 16/51* (2019.01); *G06F 16/583* (2019.01); *G06K 9/4604* (2013.01); *G06K 9/6202* (2013.01); *G06T 7/75* (2017.01); *G06T 2207/10028* (2013.01); *G06T 2207/10032* (2013.01); *G06T 2207/30244* (2013.01)

(58) Field of Classification Search
CPC ...... G06K 9/4604; G06K 9/6202; G06T 7/70; G06T 7/75; G06T 2207/10028; G06T 2207/10032; G06T 2207/30244
See application file for complete search history.

(56) References Cited

U.S. PATENT DOCUMENTS

| | | |
|---|---|---|
| 8,983,201 B2 | 3/2015 | Cai |
| 8,989,483 B2 | 3/2015 | Cheng |
| 9,418,482 B1 | 8/2016 | Yang |
| 10,021,254 B2 | 7/2018 | Doyle |
| 2007/0286459 A1 | 12/2007 | Gal |
| 2010/0329542 A1 | 12/2010 | Ramalingam |
| 2011/0052083 A1 | 3/2011 | Rekimoto |
| 2013/0044128 A1 | 2/2013 | Liu |
| 2013/0127851 A1 | 5/2013 | Richards, Jr. |
| 2014/0029856 A1 | 1/2014 | Cai |
| 2015/0006117 A1 | 1/2015 | Zhang |
| 2015/0373281 A1 | 12/2015 | White |
| 2016/0292502 A1 | 10/2016 | Bostick |
| 2017/0301104 A1 | 10/2017 | Qian et al. |

OTHER PUBLICATIONS

Baatz et al. "Large scale visual geo-localization of images in mountainous terrain." European conference on computer vision. Springer, Berlin, Heidelberg, 2012. (Year: 2012).*

Chen et al. "Camera geolocation from mountain images." 2015 18th International Conference on Information Fusion (Fusion). IEEE, Jul. 2015. (Year: 2015).*

Zeisl et al. "Using Photographs to Build and Augment 3D Models." Peer Reviewed Proceedings of Digital Landscape Architecture 2014 at ETH Zurich (DLA 2014) (Jan. 2014): 27-42. (Year: 2014).*

An et al. "Three- dimensional point cloud based sky view factor analysis in complex urban settings." International Journal of Climatology 34.8 (2014): 2685-2701.

Hofmann et al. "Skyline matching based camera orientation from images and mobile mapping point clouds." ISPRS Annals of the Photogrammetry, Remote Sensing and Spatial Information Sciences 2.5 (2014): 181.

Kodama et al. "Skyline queries based on user locations and preferences for making location-based recommendations." Proceedings of the 2009 International Workshop on Location Based Social Networks. ACM, 2009.

* cited by examiner

FIG. 3B

| contour word | [(x,y location); viewing direction] |
|---|---|
| 0 | [(1042,0098); 47] [(6290, 4209); 325] |
| 1 | |
| 2 | [(7982,1444); 162] |
| ... | ... |
| 15,735,006 | [(1042,0098); 57] |
| 15,735,007 | [(7982,1444); 222] [(6290, 4209); 327] |
| ... | ... |

FIG. 4 Image Rendering of LIDAR Data
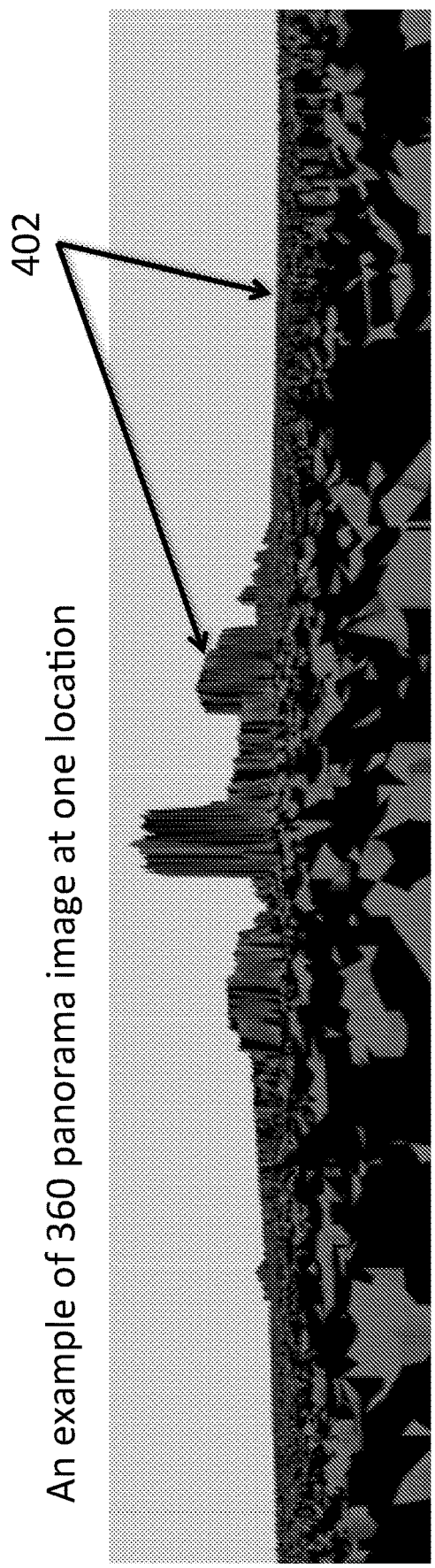
An example of 360 panorama image at one location

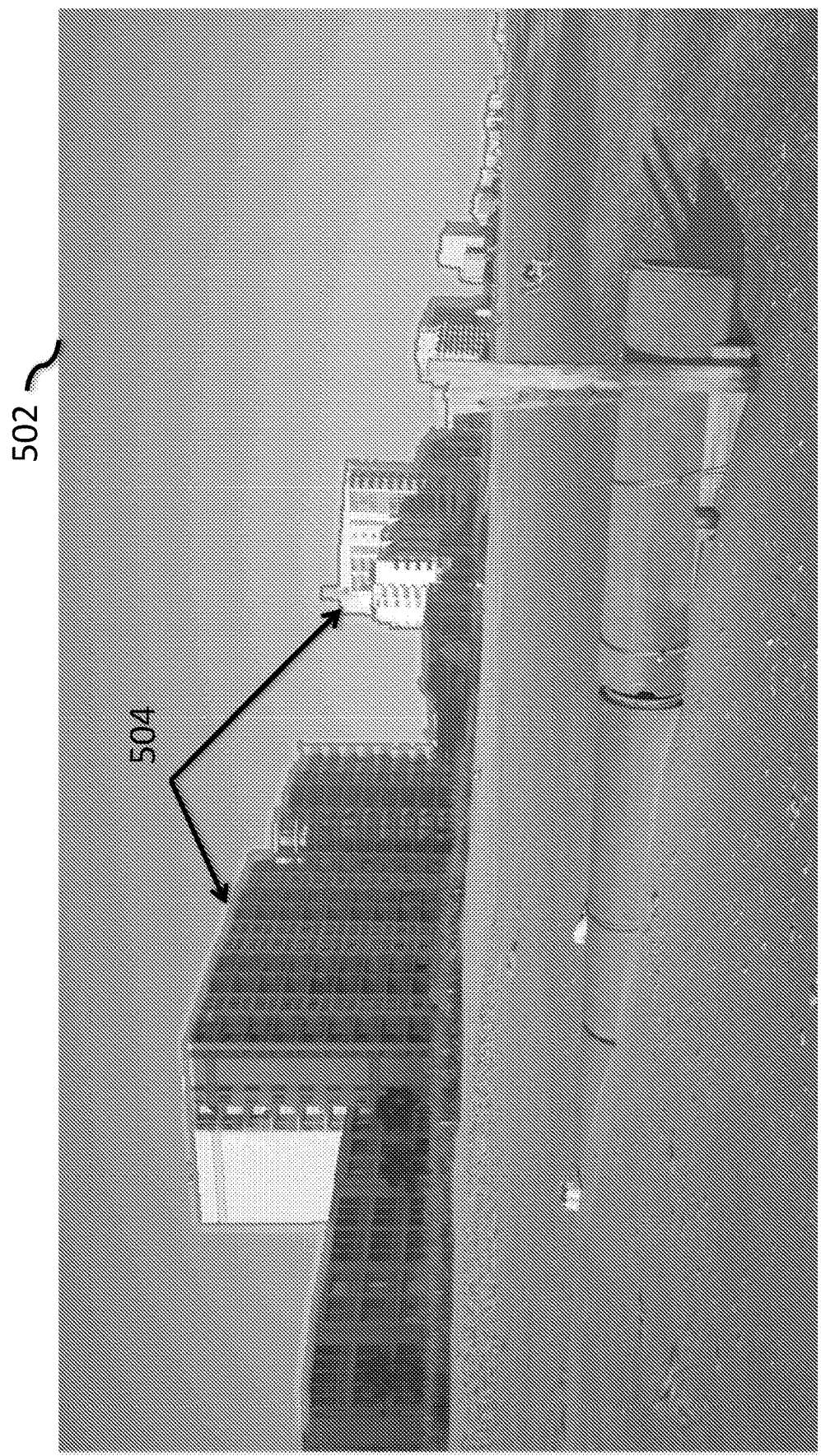
FIG. 5 Query Image Skyline

US 10,930,005 B1

PROFILE MATCHING OF BUILDINGS AND URBAN STRUCTURES

RELATED APPLICATIONS

This application is a continuation (and claims the benefit of priority under 35 USC 120) of U.S. application Ser. No. 15/382,152, filed Dec. 16, 2016, which claims the benefit of U.S. Provisional Application Ser. No. 62/268,471, filed Dec. 16, 2015. Both of these prior applications are incorporated by reference in their entirety.

STATEMENT REGARDING FEDERALLY SPONSORED RESEARCH OR DEVELOPMENT

This invention was made with government support under Air Force Research Laboratory Contract FA8650-12-C-7212 awarded by Intelligence Advanced Research Projects Activity (IARPA). The government has certain rights in the invention.

BACKGROUND

It is often helpful to detect where an image was generated, such as where a photograph was taken. However, the shared geometric shapes of buildings (e.g., many buildings have a rectangular cuboid shape) makes photograph location determination difficult in many instances. Systems and methods to match the profiles of buildings, other urban structures and cityscapes to identify image generation locations may be helpful.

SUMMARY

A method and apparatus for determining a building/urban profile image location includes extracting a building/urban profile from an obtained image and comparing the image to a database of building/urban profiles. The database may be created by obtaining point cloud data sets scanned building/urban profiles, converting the obtained point cloud data sets to a corresponding 3D surface model, and creating the database of stored building/urban profiles viewed from multiple locations within each of the 3D surface models. By comparing the extracted building/urban profile image with the stored building/urban profiles contained within the database and finding a match the location from which the extracted building/urban profile image was taken can be determined. Disclosed methods and apparatuses may also be applied to profile matching other than urban profiles. Disclosed methods and apparatuses also contemplate improvements to matching techniques that increase accuracy and/or reduce calculations.

BRIEF DESCRIPTION OF THE DRAWINGS

The above and other objects and features will become apparent from the following description with reference to the following figures, wherein like reference numerals refer to like parts throughout the various figures unless otherwise specified. The drawings are not necessarily to scale, emphasis instead being placed upon illustrating the principles of the disclosed embodiments. In the drawings:

FIG. 3B illustrates an example of an index table;

FIG. 4 illustrates an example of a 360 degree panorama image of the 3D surface model mesh;

FIG. 5 illustrates an image query submitted to a computer and FIG. 6 illustrates the determined image generation location.

DETAILED DESCRIPTION

Figure 1:
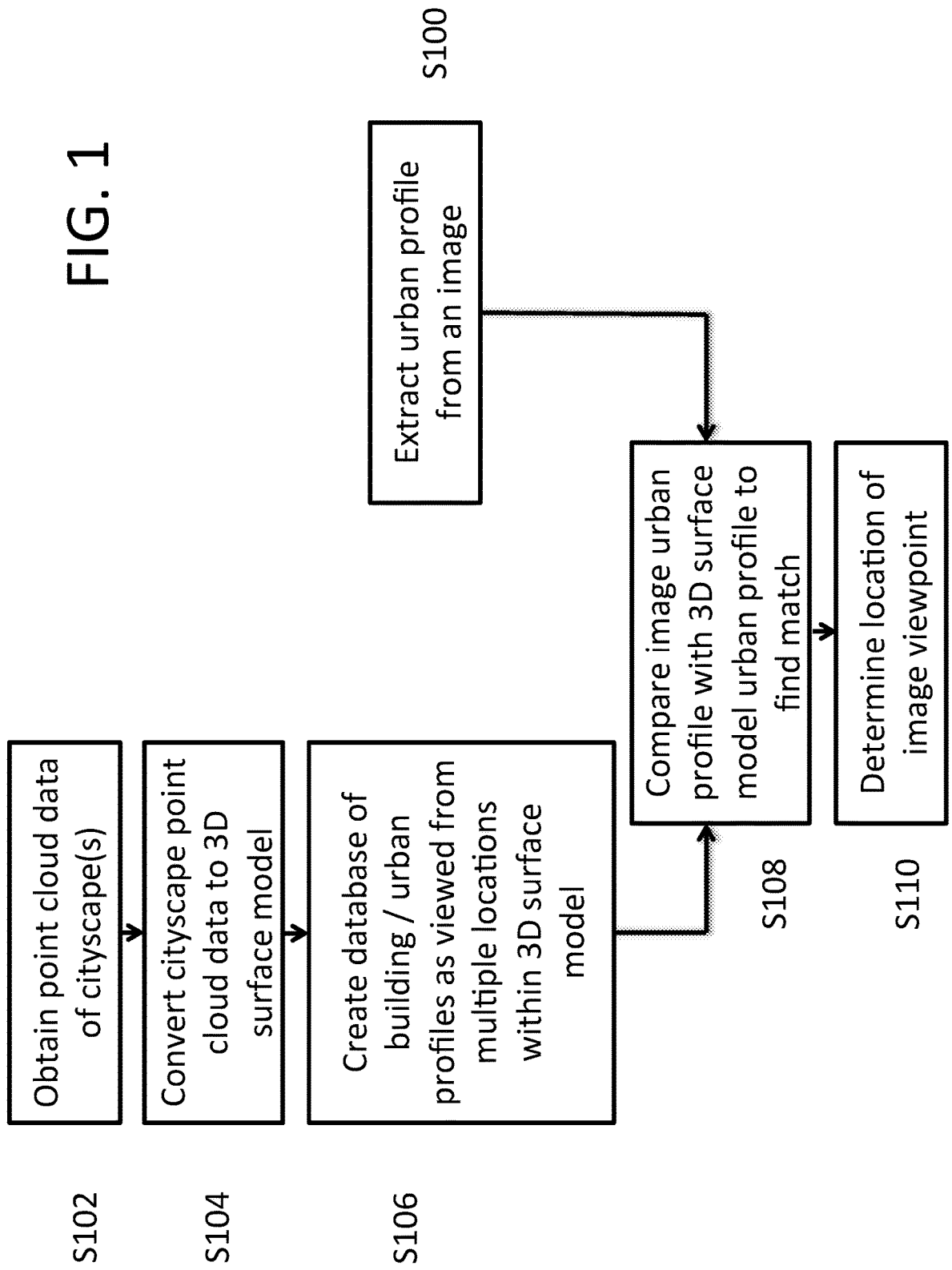
FIG. 1 is an exemplary method, consistent with certain disclosed embodiments.

The present disclosure now will be described more fully hereinafter with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, like numbers refer to like elements throughout. Though the different figures show various features of exemplary embodiments, these figures and their features are not necessarily intended to be mutually exclusive from each other. Rather, certain features depicted and described in a particular figure may also be implemented with embodiment(s) depicted in different figure(s), even if such a combination is not separately illustrated. Referencing such features/figures with different embodiment labels (e.g. "first embodiment") should not be interpreted as indicating certain features of one embodiment are mutually exclusive of and are not intended to be used with another embodiment.

Unless the context indicates otherwise, the terms first, second, third, etc., are used as labels to distinguish one element, component, or section from another element, component, or section (that may or may not be similar). Thus, a first element, component, or section discussed below in one section of the specification (or claim) may be referred to as a second element, component, or section in another section of the specification (or another claim).

As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". With the exception of "consisting of" and "essentially consisting of" it will be further understood that all transition terms describing elements of a step, component, device, etc., are open ended. Thus, unless otherwise specified (e.g., with language such as "only," "without," etc.), the terms "comprising," "including," "having," etc., may specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected," "coupled to" or "on" another element, it can be directly connected/coupled to/on the other element or intervening elements may be present. In contrast, when an element is referred to as being "directly connected" or "directly coupled" to another element, or as "contacting" or "in contact with" another element, there are no intervening elements present.

Unless otherwise defined, all terms (including technical and scientific terms) used herein have the same meaning as commonly understood by one of ordinary skill consistent with their meaning in the context of the relevant art and/or the present application.

Each block, unit and/or module described herein may be embodied as a computer. Each block, unit and/or module described herein may comprise a separate computer, or some or all of the modules and/or units may be comprised of and share the hardware of the same computer. Connections and interactions between the blocks, units and/or modules may be hardwired and/or in the form of data (e.g., as data stored in and retrieved from memory of the computer, such as a register, buffer, cache, storage drive, etc.) Each block, unit and/or module may correspond to separate segment or segments of software (e.g., a subroutine) which configure the computer, or may correspond to segment(s) of software that also correspond to one or more other blocks, units and/or modules. The computer may comprise a processor (e.g., a microprocessor, a controller, a CPU, a GPU, etc.) or processors configured by software or may be dedicated hardware or firmware (e.g., an electronic or optical circuit). A "computer" may be one or more apparatuses and/or one or more systems that are capable of accepting a structured input, processing the structured input according to prescribed rules, and producing results of the processing as output. Examples of a computer include: a stationary and/or portable computer; a computer having a single processor, multiple processors, or multi-core processors; a general purpose computer; a supercomputer; a mainframe; a workstation; a micro-computer; a server; a client; a web appliance; a telecommunications device with internet access; a tablet; a personal digital assistant (PDA); application-specific hardware, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC).

"Software" refers to prescribed rules to operate a computer. Examples of software may include: software; code segments; instructions; applets; pre-compiled code; compiled code; interpreted code; computer programs; and programmed logic.

A "computer-readable medium" refers to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that can store machine-readable instructions thereon.

A "computer system" refers to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" refers to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

The terms "urban" and "cityscape" are used to generically refer to geographical areas including manmade structures and do not require any particular density of people, buildings, building heights, etc. For example, geographical areas often considered suburban should be considered urban and should be considered as a cityscape for the purposes of this application.

FIG. 1 illustrates one example of a method to match profiles of buildings, other urban structures and cityscapes. In step S102, point cloud data of one or more cityscapes is obtained. Point cloud data may comprise a plurality of points, where each point is identified by a coordinate and represents a point of a determined surface location of an element of a cityscape. For example, the points may be defined using x, y and z coordinates in a Cartesian coordinate system, where the collection of points represents the surface of the cityscape, such as the surface of roads, sidewalks, buildings, etc. The point cloud may be obtained via measurement by a 3D scanner, such as LiDAR (Light Detection and Ranging) that is a remote sensing method that uses light in the form of a pulsed laser to measure distances to the Earth. LiDAR data of a cityscape may be obtained by flying over a location and scanning the ground area with a laser. LiDAR data may be obtained from public sources, such as, e.g., from the United States Interagency Elevation Inventory, the United States National Oceanic Atmospheric Administration (NOAA) and the United States Geological Survey. Each of the points of the LiDAR data may be associated with a known real world longitude, latitude and height (height may be relative to a detected real world ground or relative to a baseline height in the real world, such as a height above sea level). A LiDAR sensing method may provide point cloud data having a resolution of 1 meter or less.

In step S104, the cityscape point cloud data is converted into a digital surface model and then to a 3D surface model. Digital surface models (DSMs) is a well understood model, commonly used to refer to the digital elevation models (DEMs) that include man-made structures. In contrast, digital terrain models are the digital elevation models that only contain the elevation of the barren terrain of the earth. The LiDAR point cloud data is first converted to a digital surface model through rasterization. For example, the digital surface model (DSM) may be derived from overlying a grid (e.g., parallel to ground level) over the cityscape point cloud data and selecting an appropriate height based on point data within the grid element (e.g., maximum height or average height of point cloud points within the grid element). Thus, each grid element may be identified by an (x, y) coordinate and be associated with a z coordinate to obtain the 3D surface model. The 3D surface model may include surface information (e.g., heights and (x, y) coordinate locations) of urban structures (e.g., buildings or other man made structures).

The digital surface model may not include information of vertical surfaces, such as sides of buildings or other wall. Thus, a 3D surface model is derived from the digital surface model to provide vertical surface information of buildings that may not have geolocation data in the digital surface model, although this may not be necessary. The 3D surface model may comprise a 3D mesh model or polygonal model, where selected points in the modeling space are connected by line segments, the line segment forming polygons that represent a surface element of the overall 3D surface model. For ease of explanation, the 3D surface model may be referred to as a 3D surface (mesh) model, but 3D surface models may be derived (e.g., that provide surface information of vertical surfaces). Surface elevation data of the digital surface model (e.g., the (x,y,z) coordinates representing a surface location in the digital surface model) is passed to a GPU computer shader module to compute the vertex Cartesian position/normal data and the terrain tessellation factors. Then, a GPU dynamic tessellation technique is used to generate the dynamic 3D mesh surface model based on terrain details. A GPU is well to handle such processing with parallel processing. The GPU may be used to first generate the 3D surface (e.g., mesh) model. From the 3D surface (mesh) model, the GPU may also generate the depth map for selected locations and to create a 2D rendering of the 3D surface (mesh) model for a selected and location viewing direction within the 3D surface (mesh) model if desired. This approach speeds up the mesh generation and reduces the CPU memory usage. Known real world locations associated with the point cloud data may be used to provide (or to derive) real world locations for locations within the 3D mesh model. For example, known real world longitude, latitude and height may be derived from the 3D surface (mesh) model for locations within the 3D surface (mesh) model.

In step S106, a database of urban profiles as viewed from multiple locations within the 3D surface (mesh) model is obtained. For example, for a plurality of selected locations within the 3D surface (mesh) model, a determination of the profile of the cityscape as represented by the 3D surface (mesh) model from that location is determined. In some examples, the building/urban profile may be limited to just objects identified as buildings. Buildings may be identified in several ways, such as requiring an identified object of a certain size to have certain simple two dimensional geometric shapes (quadrilateral, triangle, circle, etc.) or to be consistent with certain three dimensional shapes (rectangular cuboid, prism, pyramid, etc.). The urban profile may be limited to buildings by limiting analysis to objects of appropriate height (e.g., to objects at least 10 feet tall and no taller than 300 meters, or no taller than the highest building in the world). The urban profile may be limited by selecting a portion of the 3D surface (mesh) model as the cityscape for analysis to exclude any hills or mountains from appearing in the background (so that any distance measurement above the buildings in the cityscape would be considered infinite rather than end at a hill or mountain that otherwise may be viewed behind the buildings of the cityscape). The urban profile at a particular location may be represented as a line (that may include angles and curves) with portions of the line being associated with a height (and/or altitude angle) and a real world viewing direction. Thus, a 360 degree urban skyline profile is obtained for each selected location within the 3D surface (mesh) model. When the urban profile database is created, each of the rendered urban profiles are broken down into small overlapping segments. For example, a segment may represent six (6) degrees of a 360 degree (azimuth) urban profile, and 360 six degree segments may be extracted from the 360 degree urban profile (e.g., each six degree segment overlaps its neighboring segment to share 5 degrees of the 360 degree urban profile). Each of the extracted overlapping segments are uniformly sampled, normalized, and quantized. For each segment, a 24-bit contour word is created by concatenating the quantized samples in the segment. The 24-bit contour word may contain information to identify a rough estimation of the profile of the segment. Thus, each location is associated with a plurality of 24-bit contour words (in this example, 360 24-bit contour words) that represent the urban profile at that location. These synthetic contour words are organized into an inverted index table, with the 24-bit integer contour word as the key, and rendering camera geolocation and viewing direction as the content in the corresponding entry in the inverted index table. Thus, each of the plurality of selected locations within the 3D surface (mesh) model is associated with a plurality of contour words, each contour word representing a segment of the urban profile at that location.

In some examples, the urban profile of the buildings is a profile of the group of buildings. For example, the profile of the buildings may comprise a skyline of a cityscape represented by the 3D model, where the sky "meets" the group of buildings as viewed from a particular location.

In some examples, the urban profile of the buildings may take into account more than just the skyline or edges of the building that meet with the sky as viewed from a particular location within the 3D surface (mesh) model. For example, if a first building partially occludes a second building behind the first building, an edge of the first building in front of the second building may be detected and made part of the profile of the buildings. The profile of the second building in this example may be limited to edges of the building that may be viewed (e.g., not occluded) with respect to a location within the 3D surface (mesh) model.

An urban profile for each of location of the multiple locations within the 3D surface (mesh) model is thus obtained and a record (e.g., vector) describing features of segments of each urban profile is created to create an urban profile database.

In step S100, an image is analyzed to extract an urban profile from the image. The image may be a photograph or a frame of a video of a real world scene, for example. The type of image urban profile that is extracted from the image should correspond to the type of profile extracted by the 3D surface (mesh) model, such as (a) being limited to buildings and other urban structures (and excluding features identified as landscape) or (b) comprising both buildings, urban structures and landscape features (e.g., mountains, hills). The shared type of urban profile may also (c) comprise only a skyline view of the relevant cityscape features (e.g., discussed in (a) or (b) above) or (d) comprise all viewable edges of buildings and other urban structures (whether or not being part of the skyline, as discussed herein). Image analysis may be performed on the image to extract the urban profile from the image. For example, areas identified as sky may be identified through color analysis, shared intensity and color (e.g., all connected areas at top portion of image having the similar blue color and similar intensity). As another example, the urban profile of the image may be extracted by user input, such as by having a user overlay an outline of the urban profile on top of the image via a user interface (e.g., using a finger or stylus to draw the appropriate urban profile on a touch screen displaying the image).

The image urban profile may then be analyzed in a manner similar to that of the urban profile extracted from the 3D model. In this example, the image urban profile may have overlapping segments extracted and converted into 24-bit contour words and have similar associated metadata for each overlapping segment (e.g., estimated height and/or altitude). Typical images may not capture a 360 degree view of the real world. To account for an unknown arc size of the image (an unknown view azimuth angle range), several sets of 24-bit contour words may be extracted from the image urban profile, each associating the horizontal width of the image with a different sized azimuth angle.

In step S108, the urban profile extracted from the image (image urban profile) is compared to the urban profiles stored in the database created in step S106 (3D model urban profiles). A list of best matches of the image urban profile to the 3D model urban profiles are determined. During profile matching, the contour words are extracted in the same way from the image urban profile (as described in step S106) as in the query image. These query image contour words are then matched to the synthetic contour words in the inverted indexing table. For each pair of matched contour words between the image urban profile and a 3D model urban profile at a particular location, a corresponding matching score is computed based on the frequencies of occurrence of a contour word in the query image and in the inverted indexing table. Determination of such a match of contour words may be evaluated in a binary fashion (i.e., match or no match) or in a probabilistic fashion (e.g., providing a probability value from 0 to 1 on a sliding scale representing the likelihood of a match). The resulting matching scores are then integrated as weighted votes in a voting process to create a 1D histogram heading directions (1D) for each candidate camera location. The maximum values of these 1D histograms of all candidate locations are then used to compute a 2D histogram of the candidate camera geolocations.

This matching approach takes geometric consistency into account in the voting process so that the output list contains both the candidate camera geolocations and the candidate camera heading directions. The resulting camera geolocation estimates fall on a regular grid, and the resolution of the grid depends on the quantization of the geospatial region used for sampling the surface (mesh) model.

In step S110, the location of where the image was taken is determined. The location associated with a grid cell with the highest vote out of the list of best matches (the location in the surface (mesh) model used to generate the matched 3D model urban profile) is determined as the location where the image was generated (e.g., where the picture was taken). The location may be a real world longitude, latitude and height may be derived from the surface (mesh) model for the matching location as the location where the image was taken.

Figure 2:
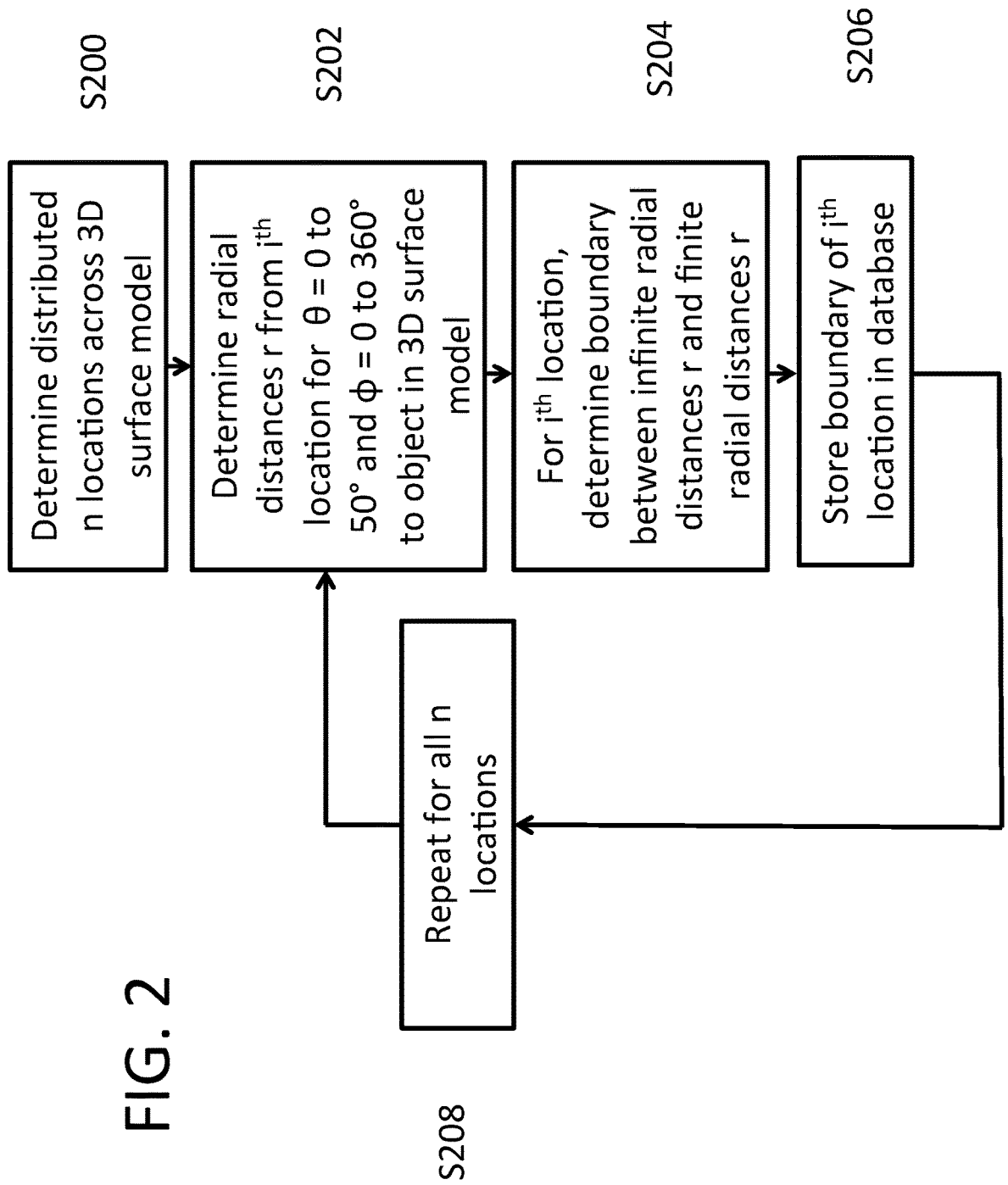
FIG. 2 is an exemplary method of implementing step S106 of FIG. 1.

FIG. 2 illustrates an example flow chart of step S106 of FIG. 1 that creates a database of building profiles and/or urban profiles. In step S200 of FIG. 2, n locations within the surface (mesh) model are determined. The n locations may be regularly and evenly spaced across various surfaces of the surface (mesh) model. For example, if the surface (mesh) model is a mesh model, positions above certain vertices of the lines forming the polygonal shapes of the mesh model may be selected (e.g., above the vertex of the 3D surface (mesh) model 5 to 6 feet above the surface of the 3D surface (mesh) model to represent a typical height of taking a picture). Alternatively, locations may be selected using a grid like regular spacing over the surface of the 3D surface (mesh) model (e.g. at intersections of a grid), which may also be located 5 to 6 feet above the surface of the 3D surface (mesh) model. Locations may be selected to be limited to areas detected corresponding to the real world ground (e.g., detected based on slope and/or local minimum height locations). Locations may be selected to also include sides of buildings (to obtain urban skylines in an attempt to match pictures taken from windows of buildings) and/or tops of buildings.

In step S202, for an ith location of the n locations selected in step S200, distance calculations are made in a plurality of directions from the ith location. For example, consider a plurality of rays extending form the ith location towards a sphere surrounding the ith location so that the rays intersect the sphere at a plurality of locations regularly spaced across the surface of the sphere. For each of these rays, a distance is calculated from the ith location to the first object it intersects in the 3D surface (mesh) model (if there is no object to intersect, the distance is determined to be infinity). For example, radial distances r from the ith location to a nearest object may be calculated for angles between $\theta=0$ to $50°$ and $\varphi=0$ to $360°$ as $\theta$ is regularly incremented between 0 to $50°$ and $\varphi$ is regularly incremented between 0 to $360°$ for each value of $\theta$, where $\theta$ is the polar angle and $\varphi$ is the azimuth with respect to the ith location (the origin of this spherical coordinate system).

In step S204, a boundary between the radial distances having a finite value and radial distances having an infinite value is determined. The boundary may be represented as a sequence of locations (or segments between these locations) projected onto a sphere or cylinder of a predetermined distance away from the ith location along the rays associated with this boundary (e.g., along the rays associated with finite distance measurements immediately adjacent rays associated with infinite distance measurements).

It should be noted that steps S202 and S204 may be performed iteratively for each ith location so that a coarse determination of the boundary first may be determined and further distance calculations about that boundary may be made (e.g., at ray directions between rays associated with finite distance calculations and rays associated with infinite distance calculations) to provide finer determination of the boundary.

It will be appreciated that other urban profiles than that described above may be performed. For example, boundaries between abrupt significant distance changes can be determined (e.g., corresponding to an edge of a building in front of a background object). This may be detected by comparing a change in the gradient of distance measurements to a threshold (e.g., if the second derivative of the distance measurements along the above discussed rays with respect to a horizontal or vertical direction, e.g., is above a certain threshold). Other calculations for building edges may be made (such as determining appropriate direction requirements, such as analysis to verify vertical, horizontal directions and/or directions to connect between other building edges).

It will also be appreciated that other depth determinations may be made than that described here. For example, at each of the ith view point locations, a 360 degree panoramic view of the surrounding objects/buildings is rendered. The panoramic view can be rendered by merging multiple views with a narrower horizontal field of view (e.g., 30 degrees), each view pointing to a different horizontal viewing direction. Each segment of the panoramic view may have its urban profile calculated, and then these multiple urban profiles (e.g., 12) may be merged to approximate a projection of the urban profile on to a cylindrical projection surface.

At step S206, a boundary (e.g., the boundary projected onto a projection surface of a fixed radial distance from the ith location) is stored as the urban profile for the ith location as a record in the 3D surface (mesh) model urban profile database. As discussed herein, the rendered profiles are broken down into small overlapping segments that are uniformly sampled, normalized, and quantized. For each segment, a 24-bit contour word is created by concatenating the quantized samples in the segment. These synthetic contour words are organized into an inverted index table, with the 24-bit integer contour word as the key, and rendering camera geolocation and viewing direction as the content in the corresponding entry in the inverted index table. This inverted index table is also stored in the database. Further details profile matching including use of contour words may be found in "Camera Geolocation From Mountain Images" by Chen et al. incorporated herein in its entirety by reference.

In step S208, steps S202, S204 and S206 are repeated for each of the n locations so that an urban profile for each of the n locations may be obtained.

Figure 3A:
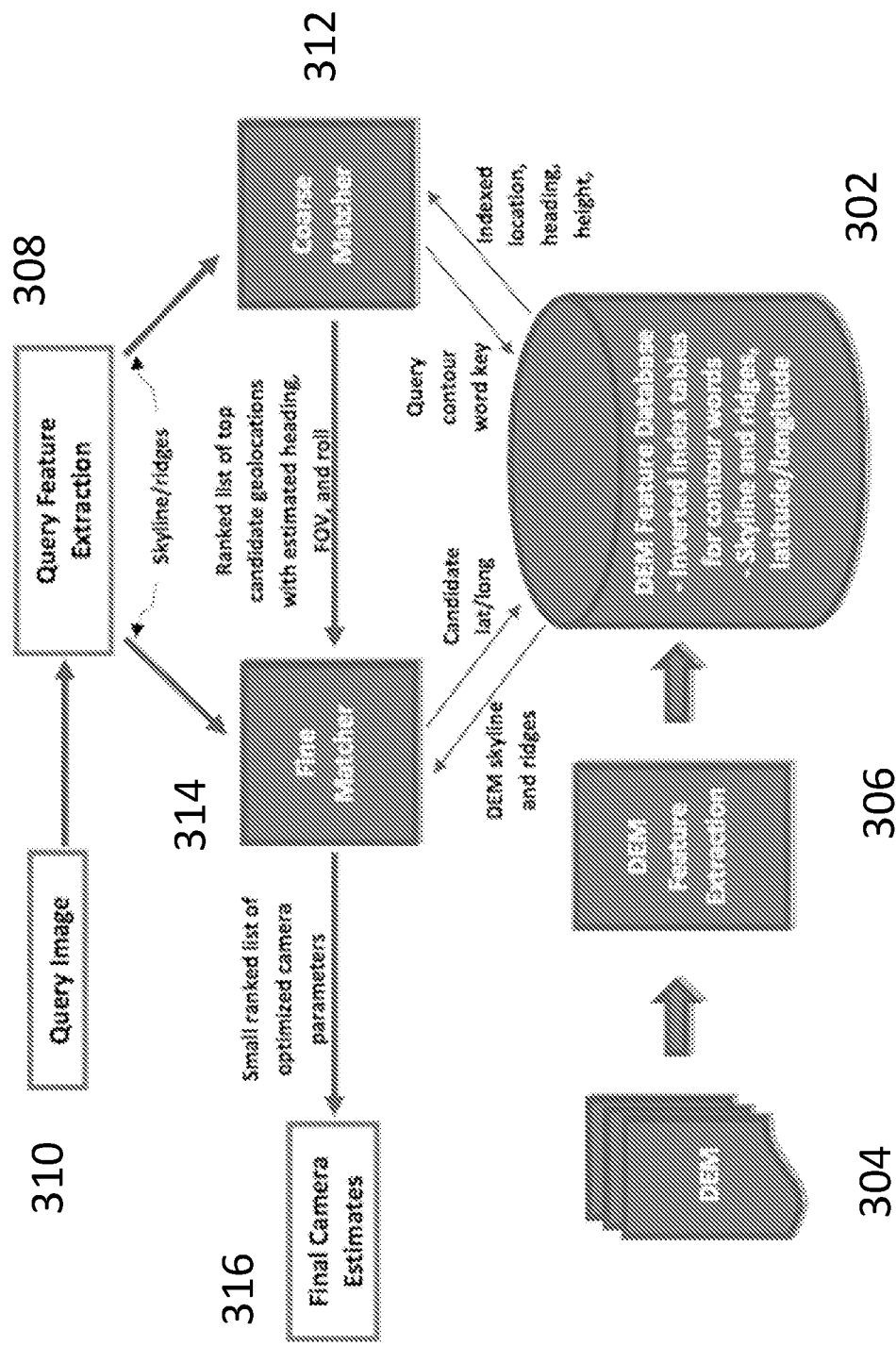
FIG. 3A illustrates an exemplary system according to certain disclosed embodiments.

FIG. 3A illustrates an exemplary system that may be configured to implement the methods described herein. The modules of FIG. 3A may be implemented as described herein, such as by software code configuring a general purpose CPU and/or GPU. A digital elevation model feature database 302 stores inverted index tables as described herein. The inverted index tables may comprise a list of synthetic contour words each describing the shape of a segment of a profile, such as a segment of a synthetic urban skyline. Each synthetic contour words may be associated by the table with one or more 3D surface (mesh) model urban profiles that have been determined to contain a segment represented by the synthetic contour word.

FIG. 3B illustrates an example of such an index table, showing synthetic contour words listed in the left column (in decimal form for ease of description—these contour words may correspond to the 24-bit contour words described herein). The right column contains entries of those 3D surface (mesh) model urban profiles that have been determined to contain a segment that matches the synthetic contour word. In this example, locations (1042, 0098) and (6290, 4209) in the 3D surface (mesh) model have each been determined to have a segment of a their determined urban profile that is described by contour word 0. The view direction of such segments is represented in this example with an azimuth angle of 47 degrees and 325 degrees (with respect to true north, e.g.), respectively. The location may correspond to a (x,y) coordinate, such as a grid location of the 3D surface (mesh) model, and may be used to calculate real world geolocations. It will be clear that alternative location identifiers may be used, such as a single value known to correspond to a particular grid location of the 3D surface (mesh) model and real world location. As shown in FIG. 3B, some of the synthetic contour words may not have any matches associated with them (such as contour word "1"). Further, the plurality of segments of each urban profile will be mapped to appropriate contour words and have multiple entries (e.g., with different viewing directions) in the inverted index table.

The inverted index table, such as that of FIG. 3B, may be obtained from analysis of digital elevation models 304 by DEM feature extraction module 306. As described herein, the digital elevation models 304 may comprise digital surface models that contain surface information of urban structures. The DEM feature extraction module 306 may convert the digital surface models to 3D surface (mesh) models (having interconnecting polygonal elements) that are used to extract urban profiles a plurality of locations (e.g., at a plurality of different grid locations of a horizontal grid overlaying the 3D surface (mesh) model, and at a vertical height such as at ground or at average head height above ground level, such as 1.6 m). The 3D model urban profile may be a skyline profile or another urban profile, as described herein, and may be extracted based on the methods described herein, such as that with respect to FIG. 2. The DEM feature extraction module 306 may then, for each of a plurality of overlapping segments of each 3D model urban profile, as described herein which may then be used to create the inverted index table, such as that shown in FIG. 3B.

Query extraction module may analyze query image 310 and extract an urban profile from the query image, and determine the contour words that correspond to the plurality of overlapping segments of the extracted image urban profile. This may be performed as described herein. It will be appreciated that both the query feature extraction module 308 and the DEM feature extraction module 306 may comprise the same software to configure appropriate hardware (e.g., computer, CPU, etc.).

Coarse estimation module 312 may then compare the image urban profile extracted from the query image 310 with each of the 3D surface (mesh) model urban profiles. In this example, each of the contour words associated with the image urban profile are used to look up which 3D surface (mesh) model urban profiles also contain the same contour word. The coarse estimation module 312 may determine the number of matches of the image urban profile contour words to the contour words of a particular 3D surface (mesh) model urban profile to determine its likelihood to be associated with that particular 3D surface (mesh) model urban profile. The likelihood may also take into consideration geometric consistency of the matched contour words by reference to the viewing direction associated with the matches. In this matching process, once an image urban profile contour word is matched to a 3D surface (mesh) model contour word, the camera viewing direction can be estimated based on the relative direction shift from the image center to the image urban profile contour word and the absolute direction of the matching 3D surface (mesh) model contour word. A vote will then be added to the bin corresponding to this estimated viewing angle in the 1D histogram of viewing directions for this candidate location. Multiple 1D histograms may be involved, one for each candidate location where the matching 3D surface (mesh) model contour word is visible. The list of locations where a matching 3D surface (mesh) model contour word is visible is included as part of the record in the inverted index table of database 302. The matching and tabulation (e.g., addition) of the number of matches may be performed by comparing each set of 3D surface (mesh) model urban profile contour words (for each of the plurality of locations of the 3D surface (mesh) model) by matching the image urban profile contour words with these 3D surface (mesh) model contour words using the inverted index table of database 302.

Coarse estimation module 312 may output a list of the top candidate geolocations, with each candidate geolocation being associated with an estimated viewing direction, field of view and roll. The valid viewing directions may be used to determine the center of the image query and a viewing direction associated with the center of the image may be determined as the viewing direction of the image query. The image query may have unknown roll and an unknown field of view. Therefore, the image query may be repetitively analyzed and compared to the 3D surface (mesh) model (via profile matching) for each of different pairs of FOV and roll for a range of FOVs and a range of rolls. The candidate geolocation may thus be associated with the assumed FOV and roll associated with the image query.

As will be appreciated, each candidate geolocation will correspond to a group of viewing directions, the viewing directions being those viewing directions associated with the contour word match. For example, if geolocation (6290, 4209) of FIG. 3B is considered a candidate geolocation due to a matches of the image urban profile contour words with synthetic contour words "0" and "15,735,007," viewing directions 325 and 327 would be part of a larger set of viewing directions corresponding to this candidate geolocation. It will be appreciated that not all viewing directions associated with matching contour words may be part of the set of viewing directions analyzed by the coarse estimation module 312—in the event a random match occurs with respect to a profile segment contour word of the candidate geolocation (e.g., at a view direction of 145 degrees in this example), while the remaining viewing directions correspond to several hundred matched contour words with viewing direction between 319 degrees and 339 degrees, the viewing direction that does not correspond to a cluster of viewing directions may be ignored (i.e., only those viewing directions that form part of a series of viewing directions separated by regular intervals may be considered as valid viewing directions).

The ranked list of top candidate geolocations as well as the set of matched contour words and viewing directions associated with each top candidate geolocation is output to fine estimation module 314 which may perform a finer analysis of the matching between the contour words of the geolocation and those of the image query. For example, such finer analysis may take into account the order and regularity of the matched contour words as revealed by the viewing directions associated with the matched contour words. In some examples, the coarse estimation module 312 and the process of coarse matching may not select a top candidate based on analysis of the viewing directions associated with the matched contour words but only based upon the tabulation of the matches (e.g., the number of matches or a summation of weighted match values) so that order between the matches may not be part of the top candidate selection of the coarse estimation module. Exemplary operation of the fine estimation module 314 will be made elsewhere herein.

Figure 6:

FIGS. 4-6 illustrate experimental results implemented by one exemplary embodiment of the invention. LIDAR data was obtained from NOAA (1998 Fall East Coast LiDAR data). Resolution of the LiDAR data was 0.8 meters horizontally and 15 cm vertically. LiDAR data of only the coastline area of MD/VA/SC/NC was used to create a 3D mesh model and an urban profile database as described herein. The urban profile corresponded to the skyline urban profile as described herein. FIG. 4 illustrates an example of a 360 degree panorama image of the 3D surface (mesh) model mesh. A skyline urban profile 402 associated with this location is shown in FIG. 4.

FIG. 5 illustrates an image query submitted to a computer. Specifically, FIG. 5 shows an image 502 having a skyline urban profile 504 superimposed on the image 502. In this example, the skyline image profile 504 was input manually (e.g., drawn over the image as an input to the computer), however an image query may be submitted without requiring subsequent user input to denote the skyline image profile or other urban profiles. As noted herein, such profiles may be automatically detected, such as by edge analysis (to detect linear building edges and corners) as well as determination of portions of the image query that is an image of the sky. FIG. 6 illustrates the determined image generation location 602 (the determination of where the picture was taken) as determined by the computer and the actual image generation location 604, offset by the determined image generation location by approximately 10 meters.

Various example details of matching of urban profiles and use of such matching to determine geolocations has been described herein. The following provides further exemplary detail of profile matching that may be used to match urban profiles, such as an urban skyline, and determine a location of a where a photograph was taken, for example. Referring to FIG. 3A, given a geospatial region of interest (ROI), an associated visual feature database 302 is built by extracting and indexing skyline and ridge features from synthetic panoramic depth maps rendered using the corresponding DEM data (304). When the DEM data 304 comprises building profiles (also referred to as a digital surface model DSM), the skyline may be an urban skyline and ridge features may comprise edges of buildings beyond which other buildings or terrain exists. Given a query image 310 from this ROI, the skylines and edges/ridges are first extracted from the query image by query feature extraction module 308 and then fed to a coarse estimation module 312 to obtain a ranked list of camera geolocation candidates in the quantized. The results from coarse estimation are further refined by fine estimation module 314 to obtain a short list of final camera geolocations. The final camera geolocations may be used to render synthetic views of the query image for visual inspection.

To build the multi-ridge visual feature database, panoramic depth maps are first rendered on a uniformly sampled grid within the ROI. The grid may be considered horizontal to ground overlying the DEM. The sample distance (grid spacing) may vary based on design considerations of calculation costs and accuracy. In one example, the sample distance was 250 m per sample. At each position on the grid, a panoramic depth map is generated by concatenating non-overlapping views rendered from the DEM data at this position, at an altitude of 1.6 meters relative to ground. The altitude parameter is chosen based on the assumption that the query image is taken by a person standing on ground (e.g., a range of 1.2 to 2 meters).

Urban skylines, terrain skylines, building edges and non-skyline mountain ridges may be extracted from the synthetic depth maps based on depth discontinuity. Let $d_{r,c}$ be the depth value at rth row and cth column of the depth map. In each column in the depth map, the skyline pixel is taken as the topmost pixel with finite distance to the camera. Furthermore, a pixel at location (r,c) in the depth map is detected as a mountain ridge point if a) $d_{r,c} > D_{thld}$, b) the point is on a mountain slope with slope angle $> q_{thld}$, and c) the neighborhood depth ratio $d_{r-1,c}/d_{r,c} > r_{thld}$. The first two conditions a) and b) locate pixels in the mountain regions in the depth map and the last one c) indicates a depth discontinuity. Similarly, a pixel at location (r,c) in the depth map is detected as a building edge if a) $d_{r,c}>D_{thld2}$, b) the point is on a substantially vertical surface with slope angle> $q_{thld2}$, and c) the neighborhood depth ratio $d_{r-1,c}/d_{r,c}>r_{thld2}$ (alternatively only criteria b) and c) may be used to detect a building edge). The first two conditions a) and/or b) locate pixels of a building in the depth map and the last one c) indicates a depth discontinuity.

The ridge and/or edge pixels are then connected by a tracing algorithm, discarding isolated points and short ridges. In our experiments, $D_{thld}$=500 m, $q_{thld}$=10, and $r_{thld}$=1:4. Smaller threshold values may be used to building edge detection.

Figure 7:
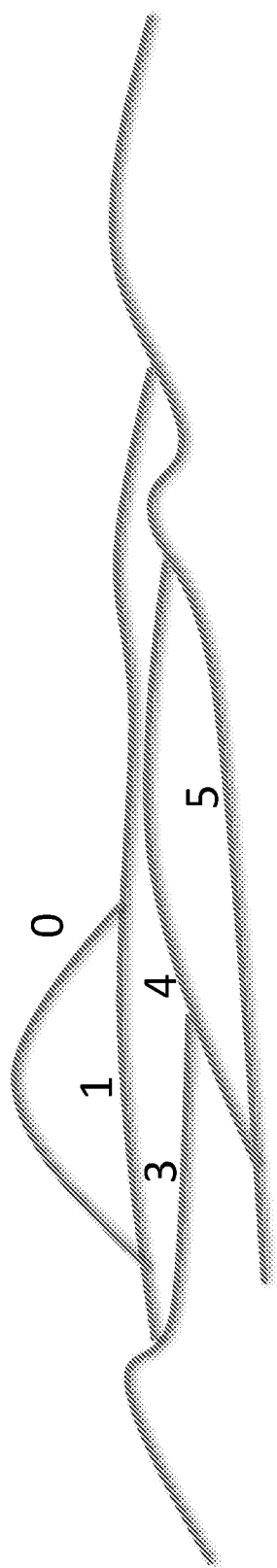
FIG. 7 illustrates an example of the extracted skyline and ridges.
Figure 8B:
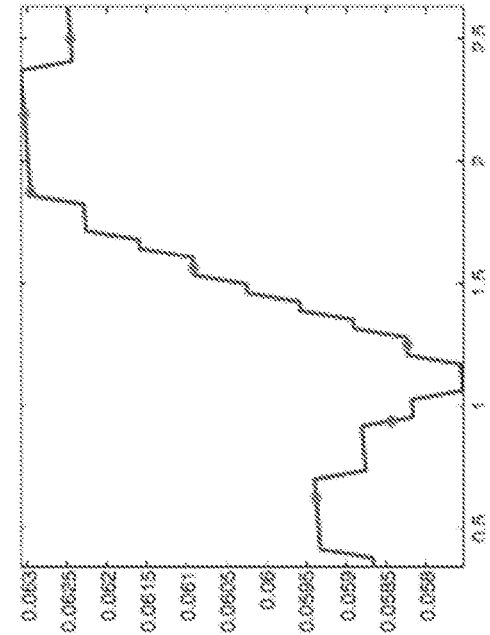
FIGS. 8(*a*) to 8(*d*) illustrate an exemplary process of contour word generation.
Figure 8D:
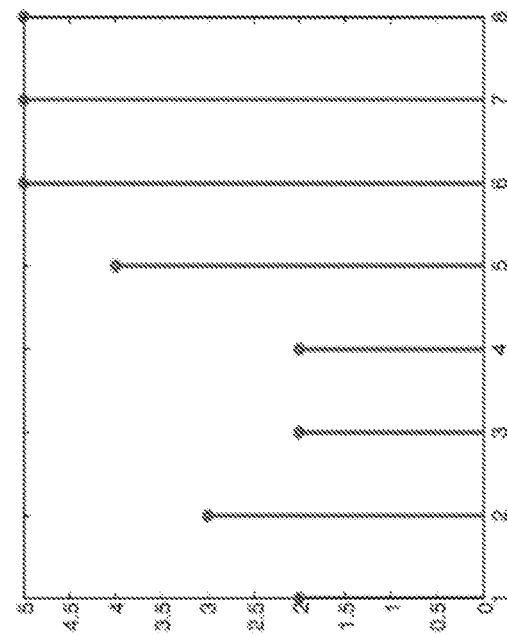
Figure 8A:
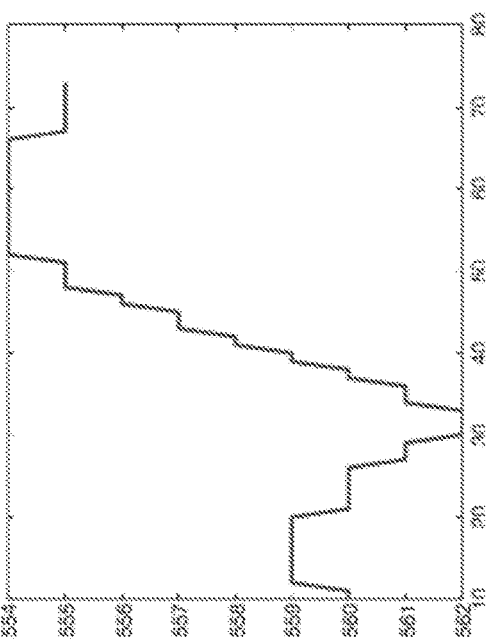
Figure 8C:
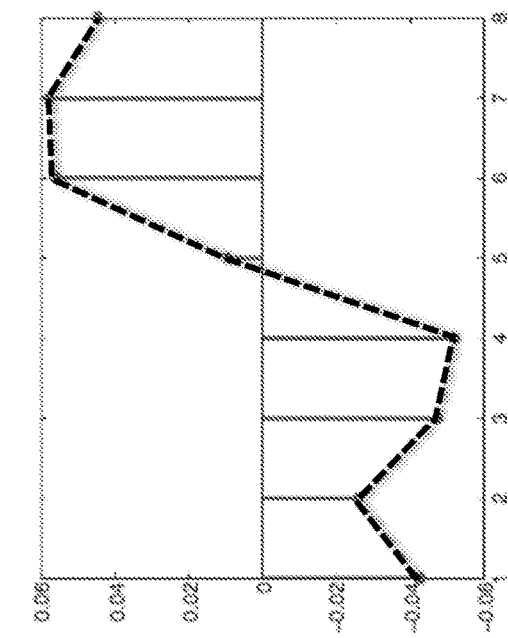

The following discussion relates to terrain modeling and matching only, but will be apparent as to application to urban profiles containing buildings, where detected edges of buildings that do not form part of an urban skyline correspond to detected internal ridges. Duplicate description is therefore omitted. The skyline is assigned a layer index of 0, and internal ridges are labeled with layer indices starting from 1 in a raster scan fashion from left to right and from top to bottom. An example of the extracted skyline and ridges is shown in FIG. 7. The skyline and ridge pixels are then rectified to the normalized image plane to reduce the distortion around image boundaries. The latitude and longitude of each pixel on the skyline and ridges are calculated from the depth map and camera parameters. The skyline and ridge pixel coordinates and world coordinates are saved as binary files in the database indexed by the grid position. These features may be used in the refinement process. The skyline and each of the ridges are handled individually to extract the contour words as discussed herein with respect to an urban skyline. We use three different feature windows of width 2.5, 5, and 10 degrees. FIGS. 8(a) to 8(d) illustrate an exemplary process of contour word generation. FIG. 8(a) shows the raw skyline (layer index 0) in a feature window of width w=2:5 degrees. The raw segment is rectified and uniformly sampled (FIG. 8(b)). The mean of these samples are removed, and the samples are normalized by w (FIG. 8(c)). The normalized sampled are quantized into 8 disjoint bins (FIG. 8(d)). Finally, the 24-bit integer (contour word) representing this segment is calculated. In this example, the integer is calculated as (2,3,2,2,4,5,5,5)= (010011010010100101101101)=5056877. An inverted index table is created using the 24-bit contour word and feature window width w as the key. The content of the table in this example is the grid position, viewing direction, ridge layer index, and mean height of the segment.

The coarse estimation step takes the extracted skyline and ridges directly from the query image as input, and outputs a ranked list of N (e.g., N=1000) camera estimates with the latitude/longitude coordinates on the DEM sampling grid along with an estimation of the camera heading, roll, and FOV.

The camera location and heading direction are estimated from a voting process that not only checks for geometric consistency horizontally for the heading direction but in addition to takes into account the consistency of relative positions between the query image and references in the vertical direction for the ridge layer ordering. Specifically, the votes are calculated in four dimensions: the location specified by latitude/longitude coordinates, heading direction, and vertical offset on the normalized image plane. This may involve a very large 4D array A, but most of the entries are zero or have negligible small values, therefore sparse data structures can be adopted to improve the time and memory efficiency in the voting process. For each contour word from the query image with horizontal angle $v_{image}$ and height $h_{image}$, we obtain relevant DEM information from the inverted index table in quadruples (i, j, $v_{DEM}$, $h_{DEM}$), where i and j are integers indicating the location on the DEM grid given by the latitude/longitude coordinates, $v_{DEM}$ is the heading direction, and $h_{DEM}$ is the height. For each entry in the table, we calculate the horizontal offset between the viewing directions $d_v$ and vertical offset between the heights $d_h$ as follows.

$$d_v = v_{image} - v_{DEM}, d_h = h_{image} - h_{DEM} \quad (1)$$

The offsets are then quantized into disjoint bins $$b_v = \left\lfloor \frac{1}{q_v} \cdot \text{mod}\left(d_v + \frac{q_v}{2}, 360\right) \right\rfloor, b_h = \left[\frac{d_h}{q_h}\right] \quad (2)$$

where $q_v$ and $q_h$ are the quantization step sizes for the viewing direction and height bins, respectively, and [•] and [•] are the floor and rounding operators, respectively. The appropriate bin in the array A is then updated by the weighted vote:

$$A(i,j,b_v,b_h) = A(i,j,b_v,b_h) + w \quad (3)$$

where w is the tf-idf score of this word. After all image contour words have been processed, we suppress the 4D cube of votes into a 3D one by only keeping the highest votes in the vertical offset dimension:

$$A(i, j, b_v) = \underset{b_h}{\text{argmax}}\, A(i, j, b_v, b_h). \quad (4)$$

In this way, the multiple-ridge algorithm does not require any accurate skyline and ridge order matching: the order is automatically taken care of by the height-offset bins. This is because the out-of-order matches usually result in large variations in height offsets, therefore the votes from these matches spread into multiple height-offset bins.

The profile matching also addresses camera tilt, FOV (field of view), and roll. The camera tilt angle is approximately handled by rotating the skyline vertically to adjust its position such that the mountains occupy the midupper part of the query image. The FOV is estimated by nonuniform sampling over typical FOV range (0-70 degrees). Camera roll may have a significant effect on the matching quality. To overcome the effect of camera roll, we also sample the camera roll over the range of −6 to 6 degrees, but other ranges of camera roll may be chosen (e.g., a range of −10 to 10 degrees) based on roll of typical query images and the tradeoff on computation time and quality of matching.

Figure 9A:
FIGS. 9(*a*) to 9(*d*) illustrate the effect of camera roll.
Figure 9B:
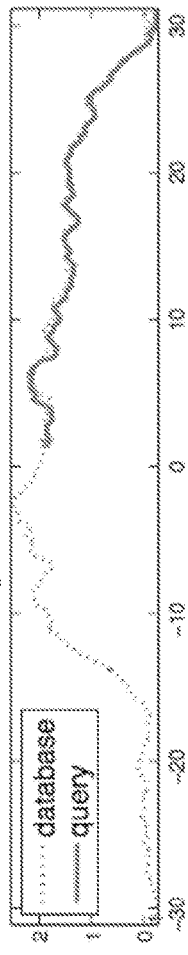
Figure 9C:
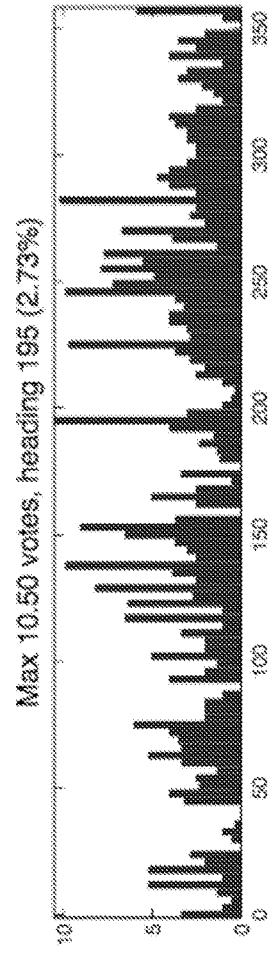
Figure 9D:
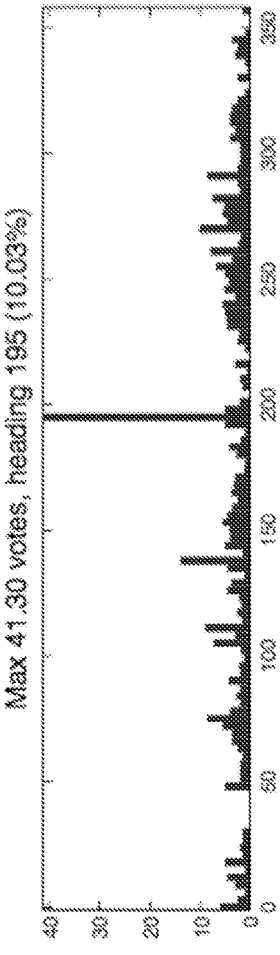

FIGS. 9(a) to 9(d) illustrate the effect of camera roll. The query image corresponding to the voting results of FIG. 9(a) has a slight roll angle of around 2.3 degrees. If a zero roll angle is assumed (FIG. 9(a)) the query skyline is considerably different from the skyline obtained from synthetic image rendered using the ground truth camera parameters, especially at the curvelet level, leading to different contour words. FIG. 9(c) shows the voting scores obtained from a comparative example baseline approach of the 120 heading direction (viewing direction) bins, centered at 0, 3, : : :, 357 degrees, at the ground truth position. We see that although the correct bin of 195 degrees has the highest voting score, the score is not prominent from the other bins. On the other hand, with a 2.3 degree rotation, the query and reference skylines almost perfectly overlap each other (FIG. 9(b)), and the bin at 195 degrees has a significantly higher score than the others (FIG. 9(d)).

In the coarse estimation process, both FOVs and rolls may be sampled and the results are re-ranked altogether. That is, several assumptions may be made about the FOV (corresponding to a azimuth angular range) and roll of the query image. However voting scores from different FOV assumptions may not be compatible to each other. This is because a larger FOV usually leads to more contour words and thus higher scores. Therefore, instead of comparing the raw voting scores from different FOVs, we use normalized voting scores for each FOV voting calculation. For each FOV voting calculation, the normalization factor is determined empirically by the mean value of the maximum score for a certain FOV across all roll angles. The normalized scores are then re-ranked across all possible locations, headings, FOVs, and rolls to generate the list of coarse camera estimates.

The refinement process takes the list of coarsely-estimated camera candidates as input (top candidate geolocations). The output of the refinement step is a small list of camera candidates (e.g., no greater than 20) with estimated parameters (latitude, longitude, altitude, heading, roll, tilt, and FOV). The final output of the refinement step is no longer restricted to a quantized space. To obtain a pinpoint camera estimation, correspondences between the world coordinates (latitude/longitude/altitude) and pixel coordinates ([i, j]) are established. Directly obtaining the accurate correspondences from image features with a candidate rendered view is challenging due to the inaccuracies in DEM data, rendering resolution, and noise in image features, etc. However, multiple matched rendered views within a small geospatial region can be used to identify stable features for alignment.

Matching skylines corresponding to different coarse camera candidates (with different camera parameter models) have a large variation in terms of the individual pixels, implying that it is unreliable to establish correspondences using a single matching skyline. However, there are stable and common features (such as the maxima of the curve) that can be utilized for camera parameter refinement. The refinement method clusters camera candidates with similar views and exploits them in conjunction to identify stable features and to establish correspondences. A simplified pinhole camera model with intrinsic parameter of focal length, position (latitude/longitude/altitude), and orientation parameters (heading, tilt, and roll) may be used.

Given a cluster of camera estimates corresponding to different camera parameter models, real world coordinates of peaks on image skyline and ridges from all camera estimates in the cluster are first obtained. The peaks are usually considered to be the most robust terrain features. With respect to urban profiles, building edges, building corners and peaks of buildings (such as radio towers or other projections on buildings) may be used. The pixel coordinates of image and DEM peaks are extracted as the local maxima of the skylines and ridges. The local windows centered the image and DEM peaks are then aligned. In some cases, the peaks on the skyline and ridges are limited and may be insufficient for solving all unknown camera parameters. Therefore, more corresponding features are often needed in addition to the peaks. We sample the image skyline and ridges and adopt a similar local approach to associate world coordinates obtained from DEM features to the sampled points in image. The above method obtains world coordinates corresponding to pixels on image skylines and ridges.

To obtain the image pixel coordinates of distinctive world coordinates, we consider peaks extracted from DEM ridges. The DEM ridges containing such peaks are transformed to the image coordinates and then matched to the edge map of the query image derived from a compass edge detector. A template matching approach is applied to maximize the correlation between DEM ridge and image edges.

The camera position may be selected from optimized camera parameters by minimizing a weighted summation of errors between the image pixel coordinates and the projected world coordinates, with constraint on camera altitude being around 1.6 meters relative to ground. In optimization, the RANSAC algorithm may be used to handle outliers. Within each RANSAC iteration, the iteratively re-weighted least squares (IRSL) algorithm may be used, which assigns higher weights for better inliers (i.e., with smaller alignment errors):

$$\hat{a} = \underset{a}{\operatorname{argmin}} \sum w_i(a) \| y_i - P_a(x_i) \|^2 \qquad (7)$$

where $y_i$ are the pixel coordinates and $x_i$ are the world coordinate, $P_a$ is a function that projects the world coordinates to the pixel coordinates given camera parameter $a$, $w_i$ is the weight of the ith correspondence which is updated at each IRSL iteration by $$w_i^{(t+1)} = \begin{cases} \dfrac{w_i^{(t)}}{e_i^{(t)}} & e_i^{(t)} \geq \varepsilon \\ \dfrac{w_i^{(t)}}{\varepsilon} & \text{otherwise} \end{cases} \qquad (8)$$

where $$e_i^{(t)} = \| y_i - P_a^{(t)}(x_i) \|$$

is the error of the ith correspondence in the tth IRSL iteration, $\varepsilon = \min(1, 0.005\_\max(W,H))$ is a small value used to bound the weights, and W and H are the width and height of the query image, respectively. The weights are then normalized by $w_i^{(t+1)} = w_i^{(t+1)} / \Sigma_k \overline{w}_k^{(t+1)}$. After all of the clusters have been processed, the camera candidates may then be re-ranked based on number of inliers and the ratio between the number of inliers and correspondences.

Variations to the methods described herein that fall within the spirit of the invention will be apparent to one of ordinary skill. The application may apply to matching based on a single building profile and/or along with landscape profile analysis.

Methods described herein, such as those described with respect to FIGS. 1 and 2 may be implemented on a computer, a computer system and/or network. The computer, a computer system and/or network may be configured with non-transitory computer readable media to cause performance of the methods described herein.

What is claimed is:
1. A computer-implemented method comprising:
obtaining a 3D model of a city;
generating, from the 3D model of the city, synthesized segments of skylines seen at different orientations, different rolls, and different fields of view;
obtaining an image that depicts a group of buildings;
identifying, within the image, a skyline that indicates where a sky meets the group of building;

generating sets of contour words that each represent the skyline as shown in a different segment of the image according to a respective field of view;

determining a first number of matches between contour words that correspond to a first location and contour words in a first set of contour words in the set of contour words and a second number of matches between contour words that correspond to a second location and the contour words in a second set of contour words in the set of contour words;

determining that the skyline that is identified from the image matches the synthesized segments of a particular skyline seen at a particular orientation of the different orientations, a particular roll of the different rolls, and a particular field of view of the different fields of view based on the first number of matches and the second number of matches; and in response to determining that the skyline that is identified from the image matches the synthesized segments of a particular skyline seen at a particular orientation of the different orientations, a particular roll of the different rolls, and a particular field of view of the different fields of view, determining that the image was obtained with the particular orientation, the particular roll, and the particular field of view.

2. The method of claim 1, wherein identifying, within the image, a skyline that indicates where a sky meets the group of building comprises:

identifying the sky in the image by connecting areas at a top portion of the image that have a similar blue color and similar intensity.

3. The method of claim 1, wherein generating sets of contour words that each represent the skyline as shown in a different segment of the image according to a respective field of view comprises:

determining a line that traces where a depiction in the image of the sky touches a depiction in the image of the group of buildings;

determining a first contour word in the first set of contour words from a first segment of the line; and determining a second contour word in the first set of contour words from a second segment of the line, where the first segment of the line and the second segment of the line partially, but not completely, overlap.

4. The method of claim 1, wherein determining that the skyline that is identified from the image matches the synthesized segments of a particular skyline seen at a particular orientation of the different orientations, a particular roll of the different rolls, and a particular field of view of the different fields of view based on the first number of matches and the second number of matches comprises:

determining that the first number of matches is greater than the second number of matches; and based on determining that the first number of matches is greater than the second number of matches, determining that the skyline that is identified from the image matches the particular skyline.

5. The method of claim 1, wherein generating, from the 3D model of the city, synthesized segments of skylines seen at different orientations, different rolls, and different fields of view comprises:

identifying objects in the 3D model that are buildings; and
generating the skylines from only the objects that are identified as buildings.

6. A system comprising:

one or more computers and one or more storage devices storing instructions that are operable, when executed by the one or more computers, to cause the one or more computers to perform operations comprising:

obtaining a 3D model of a city;

generating, from the 3D model of the city, synthesized segments of skylines seen at different orientations, different rolls, and different fields of view;

obtaining an image that depicts a group of buildings;

identifying, within the image, a skyline that indicates where a sky meets the group of building;

generating sets of contour words that each represent the skyline as shown in a different segment of the image according to a respective field of view;

determining a first number of matches between contour words that correspond to a first location and contour words in a first set of contour words in the set of contour words and a second number of matches between contour words that correspond to a second location and the contour words in a second set of contour words in the set of contour words;

determining that the skyline that is identified from the image matches the synthesized segments of a particular skyline seen at a particular orientation of the different orientations, a particular roll of the different rolls, and a particular field of view of the different fields of view based on the first number of matches and the second number of matches; and in response to determining that the skyline that is identified from the image matches the synthesized segments of a particular skyline seen at a particular orientation of the different orientations, a particular roll of the different rolls, and a particular field of view of the different fields of view, determining that the image was obtained with the particular orientation, the particular roll, and the particular field of view.

7. The system of claim 6, wherein identifying, within the image, a skyline that indicates where a sky meets the group of building comprises:

identifying the sky in the image by connecting areas at a top portion of the image that have a similar blue color and similar intensity.

8. The system of claim 6, wherein generating sets of contour words that each represent the skyline as shown in a different segment of the image according to a respective field of view comprises:

determining a line that traces where a depiction in the image of the sky touches a depiction in the image of the group of buildings;

determining a first contour word in the first set of contour words from a first segment of the line; and determining a second contour word in the first set of contour words from a second segment of the line, where the first segment of the line and the second segment of the line partially, but not completely, overlap.

9. The system of claim 6, wherein determining that the skyline that is identified from the image matches the synthesized segments of a particular skyline seen at a particular orientation of the different orientations, a particular roll of the different rolls, and a particular field of view of the different fields of view based on the first number of matches and the second number of matches comprises:

determining that the first number of matches is greater than the second number of matches; and based on determining that the first number of matches is greater than the second number of matches, determining that the skyline that is identified from the image matches the particular skyline.

10. The system of claim 6, wherein generating, from the 3D model of the city, synthesized segments of skylines seen at different orientations, different rolls, and different fields of view comprises:
identifying objects in the 3D model that are buildings; and
generating the skylines from only the objects that are identified as buildings.

11. A non-transitory computer-readable medium storing software comprising instructions executable by one or more computers which, upon such execution, cause the one or more computers to perform operations comprising:
obtaining a 3D model of a city;
generating, from the 3D model of the city, synthesized segments of skylines seen at different orientations, different rolls, and different fields of view;
obtaining an image that depicts a group of buildings;
identifying, within the image, a skyline that indicates where a sky meets the group of building;
generating sets of contour words that each represent the skyline as shown in a different segment of the image according to a respective field of view;
determining a first number of matches between contour words that correspond to a first location and contour words in a first set of contour words in the set of contour words and a second number of matches between contour words that correspond to a second location and the contour words in a second set of contour words in the set of contour words;
determining that the skyline that is identified from the image matches the synthesized segments of a particular skyline seen at a particular orientation of the different orientations, a particular roll of the different rolls, and a particular field of view of the different fields of view based on the first number of matches and the second number of matches; and
in response to determining that the skyline that is identified from the image matches the synthesized segments of a particular skyline seen at a particular orientation of the different orientations, a particular roll of the different rolls, and a particular field of view of the different fields of view, determining that the image was obtained with the particular orientation, the particular roll, and the particular field of view.

12. The medium of claim 11, wherein identifying, within the image, a skyline that indicates where a sky meets the group of building comprises:
identifying the sky in the image by connecting areas at a top portion of the image that have a similar blue color and similar intensity.

13. The medium of claim 11, wherein generating sets of contour words that each represent the skyline as shown in a different segment of the image according to a respective field of view comprises:
determining a line that traces where a depiction in the image of the sky touches a depiction in the image of the group of buildings;
determining a first contour word in the first set of contour words from a first segment of the line; and
determining a second contour word in the first set of contour words from a second segment of the line, where the first segment of the line and the second segment of the line partially, but not completely, overlap.

14. The medium of claim 11, wherein determining that the skyline that is identified from the image matches the synthesized segments of a particular skyline seen at a particular orientation of the different orientations, a particular roll of the different rolls, and a particular field of view of the different fields of view based on the first number of matches and the second number of matches comprises:
determining that the first number of matches is greater than the second number of matches; and
based on determining that the first number of matches is greater than the second number of matches, determining that the skyline that is identified from the image matches the particular skyline.

* * * * *